United States Patent

Nowak

[11] 4,063,471
[45] Dec. 20, 1977

[54] METHOD OF GRINDING THE TEETH OF A CIRCULAR SAW TO AN IMPROVED CONTOUR

[75] Inventor: Robert H. Nowak, Mentor, Ohio

[73] Assignee: The Motch & Merryweather Machinery Company, Cleveland, Ohio

[21] Appl. No.: 751,572

[22] Filed: Dec. 20, 1976

Related U.S. Application Data

[60] Division of Ser. No. 697,288, June 17, 1976, Pat. No. 4,069,880, which is a continuation-in-part of Ser. No. 587,504, June 16, 1975, Pat. No. 4,012,820.

[51] Int. Cl.² .................... B23D 63/14; B24B 3/40
[52] U.S. Cl. .................................. 76/112; 51/73 R
[58] Field of Search ............... 76/112, 37, 40, 41, 76/42, 43; 51/73 R, 92 BS; 29/103 R, 105 R, 95 R; 83/835

[56] References Cited

U.S. PATENT DOCUMENTS

| 2,344,954 | 3/1944 | Aber | 29/103 R |
|---|---|---|---|
| 2,546,503 | 3/1951 | Haycock | 29/95 R |
| 2,675,603 | 4/1954 | Goehle | 29/95 R |
| 2,831,240 | 4/1958 | Maurer | 29/95 R |
| 2,891,300 | 6/1959 | Shephard | 29/95 R |
| 3,576,061 | 4/1971 | Pahlitzsch | 29/105 R |
| 3,619,880 | 11/1971 | Pahlitzsch | 29/103 R |

*Primary Examiner*—Harold D. Whitehead
*Assistant Examiner*—Roscoe V. Parker
*Attorney, Agent, or Firm*—Behr & Woodbridge

[57] ABSTRACT

A cup-shaped wheel having an abrasive rim is employed to grind the teeth of a circular saw to an improved contour. Only point or edge contact takes place between the abrasive rim and the tooth. This technique is preferably utilized in conjunction with triple-chip type circular saws of the sort used to cut metals such as steel. The contour imparted to the cutting surface of the tooth comprises a section of an elliptical cylinder and exhibits improved steel cutting characteristics when compared to prior art multi-faceted saw teeth. Since only edge contact takes place between the abrasive rim and the tooth, the wheel is essentially self-dressing.

2 Claims, 20 Drawing Figures

METHOD OF GRINDING THE TEETH OF A CIRCULAR SAW TO AN IMPROVED CONTOUR

CROSS-REFERENCES TO RELATED APPLICATIONS

This application is a division of application Ser. No. 697,288 filed June 17, 1976 and now U.S. Pat. No. 4,060,880 which is a continuation-in-part and represents an improvement over the invention described in my copending application entitled "A Circular Saw Having Teeth With An Improved Metal Breaking Geometry", U.S. Application Ser. No. 587,504 filed June 16, 1975, now Pat. No. 4,012,820, the entire disclosure of which is incorporated herein by reference.

BACKGROUND OF THE INVENTION

1. Field of the Invention

This invention relates to a method for grinding the teeth of a circular saw blade to an improved contour and further relates to the saw blade itself as generated by said method.

2. Description of the Prior Art

Circular saw blades and methods and apparatus for finishing the teeth thereof are quite common. Circular saw teeth with carbide inserts, initially having a cylindrical or spherical shape are known to those of ordinary skill in the art. For example, Goehle, U.S. Pat. No. 2,675,603 discloses the use of a cylindrical carbide element as a tooth in the context of a composite circular saw. While the insert is cylindrical in shape, it is eventually ground and faced so as to have a conventional working surface. Kolesch, U.S. Pat. No. 3,537,491 and Tyler, U.S. Pat. No. 3,788,182 both disclose the use of spherical carbide ball inserts adapted for use in other circular saws. However, as in the case of Goehle, the spheres are subsequently faced and the remaining rounded section of the sphere is not in actuality the working surface. Lewis, U.S. Pat. No. 485,503, Bruestle et al, U.S. Pat. No. 2,860,863 and LaVelle, U.S. Pat. No. 3,380,497 all disclose prior art circular saws having a rounded profile when seen from either the front or the back of the tooth. However, the working surface is neither cylindrical, conical, elliptical or spherical. Osgood, U.S. Pat. No. 238,521 and Pioche, U.S. Pat. No. 1,334,633 likewise discloses saws in which the side view profile of the tooth is rounded or cylindrical in some aspects but wherein the working surface is neither spherical, conical, cylindrical or elliptical.

The problem encountered with old-fashioned carbide tooth saws is two-fold. One of the problems is that the carbide insert is hard and brittle and cannot take interrupted cutting. During interrupted cutting the shock loading on the teeth is so great that the teeth will frequently break. The second problem associated with conventional carbide insert saws is that carbide has an affinity for many metals that it cuts. Frequently, a metal chip will get stuck on the face of the carbide insert or in the gullet thereunder. According to the prior art methods of cutting, it was often necessary to get rid of this excess metal by means of an air blast or brushes. Unfortunately, these techniques were not always satisfactory and resulted in great blade deterioration.

Recently, a saw blade having an improved metal cutting geometry was disclosed in U.S. Pat. Nos. 3,576,061 and 3,619,880 to Pahlitzsch. This type of saw blade is often referred to as the "German" geometry. According to those inventions, an improved cutting characteristic could be achieved by slightly beveling the top face of the tooth down toward the side of the tooth. This technique is similar to the technique of "breaking the corners" in order to prolong saw blade life. While the saws disclosed in U.S. Pat. Nos. 3,576,061 and 3,619,880 do display some improved cutting characteristics, they are nevertheless difficult to manufacture because they require several different grinding steps in order to achieve a satisfactory geometry. What was desired in this context was a saw blade that exhibited cutting characteristics better than those disclosed in U.S. Pat. Nos. 3,576,061 and 3,619,880 and which were easier to grind and regrind. The following patents are also of note in that they describe relevant structures: Aber, U.S. Pat. No. 2,344,954; Horth, U.S. Pat. No. 2,381,540; Soderstrom, U.S. Pat. No. 3,878,747; Haycock, U.S. Pat. No. 2,546,503; Kaiser, U.S. Pat. No. 3,434,190; Maurer, U.S. Pat. No. 2,831,240 and Shephard, U.S. Pat. No. 2,891,300.

A saw blade having characteristics better than those ascribed to the German Geometry is described in my U.S. Pat. No. 4,012,820. It was discovered that an improved working surface can be formed by grinding a portion of the face of the tooth to a continuously curved contour. Saw blades produced with teeth having a working surface with a continously curved contour exhibited superior steel cutting characteristics and were relatively easy to grind and regrind. FIG. 4a of U.S. Pat. No. 4,012,820 illustrates a plunge grinding technique for producing a continuously curved contour. FIG. 4b on the other hand, illustrates a grinding technique similar to that further disclosed herein. It was found that the machinery necessary to produce that type of saw blade had certain undesirable limitations. Accordingly, it is necessary to describe the limitations of the prior art saw grinding equipment in order to appreciate the full value of the present invention.

The practice of grinding circular saws with abrasive wheels is known to those of ordinary skill in the art. Grinding equipment is made, for example, by the Vollmer Corporation of Dornhan, West Germany, and others. One of the major problems associated with conventional prior art carbide tipped steel cutting circular saws is that they cut slowly and wear out quickly. This difficulty was greatly reduced by the discovery that if the top of the face of the saw teeth are specially shaped to have a more negative rake angle relative to the rake of the rest of the tooth face, then efficiency was greatly improved. The special shaping typically involved multiple grinding operations in which several flat facets were formed in the top of the carbide tip. While the new shape was superior to the old shape, it was nevertheless time consuming to grind due to its multi-faceted contour. A description of this prior art shape may be found in an article by Pahlitzsch and Willemeit which appeared in Volume 58, Issue 4 of Werkstattstechneik (1968).

The saw blade described in Pat. No. 4,012,820 was discovered to be superior in many characteristics to the saw blade generated by the "German" Geometry and disclosed in the patents to Pahlitzsch, U.S. Pat. Nos. 3,576,061 and 3,619,880. A device to automatically and efficiently produce the Nowak saw blades was thereafter invented by Horst Von Arnauld and Daniel J. Murphy. A description of the Von Arnauld and Murphy invention may be found in pending U.S. Pat. No. 3,964,349 entitled "Method and Apparatus for Grinding the Teeth of a Circular Saw to an Improved Contour".

The Von Arnauld and Murphy invention is directed toward the automatic machinery which grinds the circular saw teeth. The automatic apparatus and method comprehended a cup-shaped grinding wheel having an abrasive inner rim which is automatically brought into grinding contact with a tooth of a circular saw. A working (i.e. cutting) surface having a continuously curved contour is thereby generated. The working surface is further characterized in that it typically has a more negative average rake angle than the remaining portion of the face of the tooth. The invention further comprehends the use of a programmed electronic unit which automatically controls the relative movements of the grinding wheel and the saw blade during the grinding operation. According to the Von Arnauld/Murphy invention a broad section of the abrasive inner rim of the cup-shaped grinding wheel comes into substantially simultaneous contact with the face of the saw tooth. The grinding wheel plunges into the face of the tooth and remains there for as long as necessary to effectuate the necessary grinding. After the tooth is ground the grinding wheel is subsequently retracted and the new tooth is indexed into grinding position. One major difficulty experienced with the Von Arnauld/Murphy invention is that the grinding wheels were subjected to a great deal of wear. Since the same part of the grinding wheel always came into contact with the face of the saw teeth, the grinding wheel itself eventually took on the characteristic contour of the tooth to be ground. Accordingly, subsequent teeth ground with the same grinding wheel often assumed the charateristics of the grinding wheel itself and as the grinding wheel became progressively worn the contour imparted to the teeth progressively deteriorated. In addition, while the automatic method and apparatus invented by Von Arnauld and Murphy made it possible to grind teeth more efficiently, there were still some time limitations which decreased the overall speed of the machinery. Accordingly, new means were sought to improve upon the previous method and apparatus.

In addition to the foregoing prior art the following patents appear to disclose relevant structure and methodology: Armstrong, U.S, Pat. No. 1,771,602; Markhe, U.S. Pat. No. 2,874,517; Segal, U.S. Pat. No. 2,958,240; English, U.S. Pat. No. 3,304,810; Drake et al, U.S. Pat. No. 3,313,185; Daggett, U.S. Pat. No. 3,616,711 and Brenner, U.S. Pat. No. 3,766,806,

SUMMARY OF THE INVENTION

Briefly described the present invention comprises a circular saw blade and a method and apparatus for automatically generating the same. The circular saw blade is characterized by a working surface which substantially comprises a section of an elliptical cylinder. According to the preferred embodiment of the invention the working surface is located at the top of the front face of the tooth and has a negative rake angle in the range of −10° to +5° with reference to the rest of the face of the tooth. This geometry is especially useful with triple-chip cut saw blades of the sort frequently employed for cutting steel. Such steel cutting saw blades are typically provided with carbide tip inserts which are adapted to take a special facing.

The improved working surface just described is imparted by a cup-shaped grinding wheel having an abrasive rim. The grinding wheel is allowed to pass over the face of the tooth at any one of a variety of angles. In passing over the face of the tooth only one point or a plurality of points lying in a straight line come in grinding contact with the tooth at any one time. This technique will be referred to herein as point contact or edge grinding. Since the grinding wheel is circular and because it is generally tilted at an angle with respect to the tooth, the surface imparted to the tooth is elliptical. One major advantage of the improved method is that the wheel is self-dressing and therefore does not take on the contour of the tooth. According to the present invention, the cup-shaped grinding wheel comes into point contact with the front face of the tooth as it passes over it. According to the technique described in the Von Arnauld/Murphy invention disclosed in copending application Ser. No. 540,449, the grinding wheel would plunge into the surface of the tooth rather than pass across it.

These and other features of the present invention will be more fully understood in view of the following drawings and description of the invention.

BRIEF DESCRIPTION OF THE DRAWINGS

FIG. 1b is a superimposed front elevation of a high low circular saw tooth which was fabricated in the triple-chip manner illustrated in FIG 1a.

FIG. 2b is a front elevation of the tooth identified as element A in FIG. 2a.

FIG. 2c is a front elevation of the tooth identified as element B in FIG. 2a.

FIG. 3b is a top plan view of the prior art saw tooth of FIG. 3a.

FIG. 3c is a front superimposed view of the prior art saw tooth of FIG. 3a.

FIG. 3d is a detailed view of prior art tooth B of FIG. 3a.

DESCRIPTION OF THE INVENTION

During the course of this detailed description like numbers will be used to identify like elements according to the different figures illustrated herein.

FIGS. 1a through 4 illustrate relevant circular saw blade teeth generated by various different prior art techniques. A similar complete description of prior art techniques can be found in my copending application U.S. Ser. No. 587,504 filed June 16, 1975. That application discloses the structure of a circular saw blade having teeth with a continuously curved working or cutting surface. That structure will be referred to hereinafter as the Nowak structure.

Figure 1A:
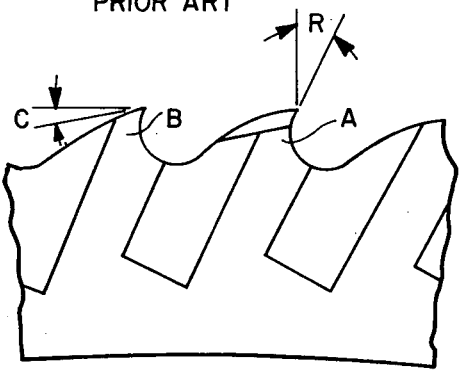
FIG. 1a is a side elevation of a conventional circular saw manufactured according to the well known triple-chip form.
Figure 1B:
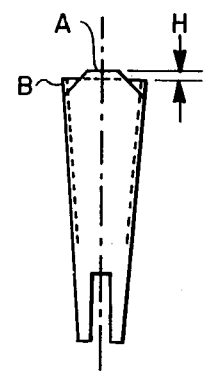

A prior art circular saw ground according to the well known triple-chip technique is illustrated in close-up detail in FIG. 1a. According to the triple-chip technique a leading tooth A removes a center chip and a trailing tooth B removes two chips flanking the center chip removed by tooth A. The leading tooth A is typically taller than trailing tooth B. This relationship is illustrated in superimposed fashion in FIG. 1b. The shape of the saw teeth can further be described in terms of a rake angle R and a clearance angle C. The rake angle R may be defined as the angle subtended by the face of each tooth with respect to a line drawn between the top of the tooth and passing through the geometrical center of a circular saw. The clearance angle C may be defined as the angle subtended by a line parallel to the surface of the top of a tooth with respect to a line tangent to the top of a tooth. The term rake angle and clearance angle as they are used in this context carry with them conventional connotations typically ascribed to them in the saw tooth art.

Figure 2A:
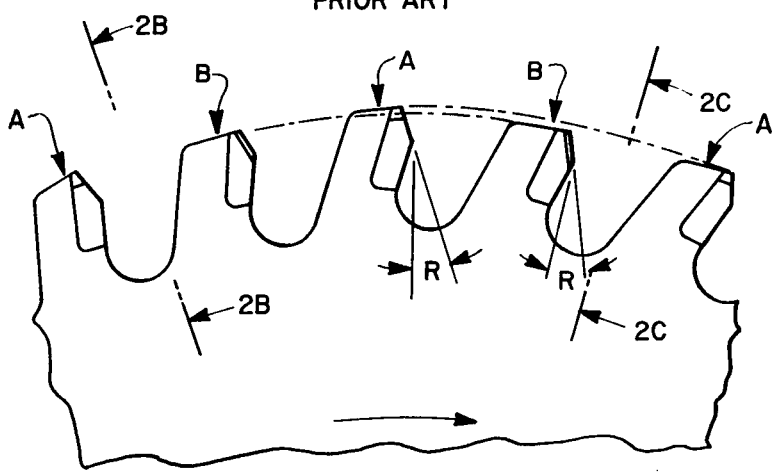
FIG. 2a is a side elevation of the circular saw teeth disclosed in U.S. Pat. No. 3,576,061.
Figure 2B:
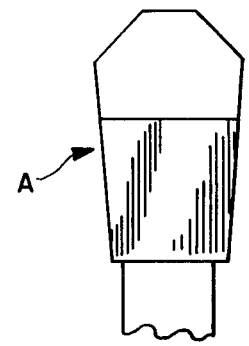
Figure 2C:
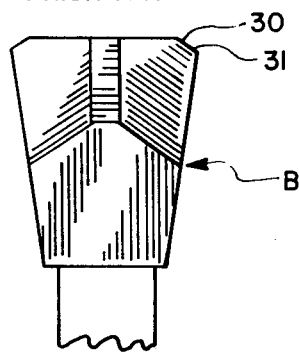

FIGS. 2a through 2c illustrate another prior art triple-chip saw blade. The teeth disclosed in FIGS. 2a - c are described in further detail in the Pahlitzsch patents U.S. Pat. Nos. 3,576,061 and 3,619,880. Among other features, the "low" teeth of the Pahlitzsch invention include laterally opposed cutting corners 30 and cutting edges 31 which add to its improved performance. The teeth described in FIGS. 2a through 2c are frequently referred to in the saw tooth art as being teeth manufactured according to the "German" geometry. Saw blades manufactured according to the German geometry tend to exhibit better metal cutting characteristics and longer life. However, they are uniformly difficult to grind since each saw tooth requires at least two and sometimes more individual grinding operations in order to produce the facets necessary to create the desired geometry. It is a major purpose of the present invention to provide circular saws having metal cutting characteristics superior to the characteristics associated with the new German geometry and, further, it is the purpose of the present invention to provide a geometry which could be formed with only one grinding operation. The decrease in the number of grinding operations achieved by the present invention directly increases the profitability per grinding machine. For example, if a grinding machine in a saw blade grinding plant is being used full time, and if the grinding steps per tooth can be reduced to one grinding operation, then that particular operation may be able to grind more saws for any given time period.

Figure 3A:
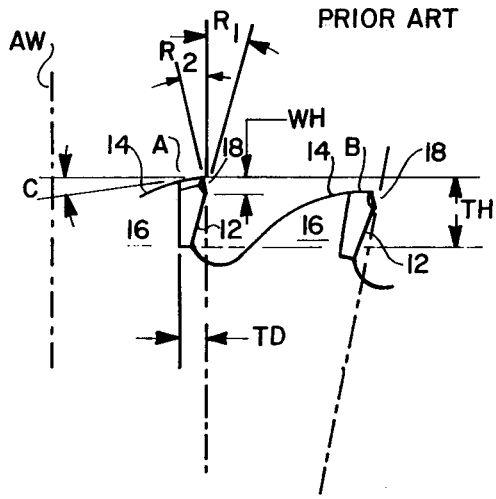
FIG. 3a is a side elevation of a section of a circular saw according to a prior art embodiment.

Prior art circular saw teeth generated according to the teaching of copending application Ser. No. 587,504 are illustrated in detail in FIGS. 3a through 4. In FIG. 3a the saw teeth ground according to the prior art invention is illustrated in the context of a triple-chip ground saw blade. According to the triple-chip principal, a plurality of high leading teeth A are interspersed alternatively with a plurality of lower turning teeth B. A circular saw ground according to this prior art teaching therefore includes a plurality of teeth A and B arranged in the following sequence A, B, A, B, A, B, etc. Each tooth A and B includes a front leading surface 12 and a back trailing surface 14. Each tooth further includes a pair of substantially similar side surfaces 16 and a front working surface 18. It will be noted in FIGS. 3a and 3b that the working surface 18 appears on both the higher leading tooth A and the lower trailing tooth B. In FIG. 3c the front profile of the leading tooth A is superimposed over the front profile of trailing tooth B. Since the circular saw is manufactured using the triple-chip technique, the leading tooth A is higher than the trailing tooth B by an amount H. H may typically range from .010 to .012 inches. The leading tooth A also includes a central top plateau surface P with dimensions of approximately 0.12 inches. The top sides of tooth A are tapered with a bevel BV of approximately 45°. Both teeth have a side clearance SC of approximately 2° and tooth B exhibits a Kerf K of 0.247 inches approximately.

Figure 3B:
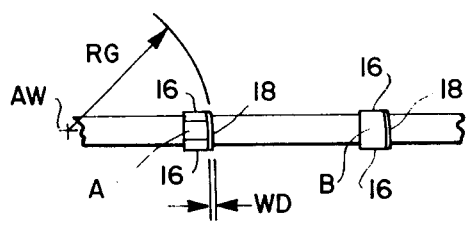
Figure 3C:
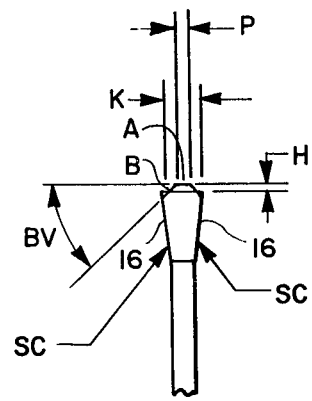

As shown in FIGS. 3a and 3b, both teeth A and B exhibit a tooth depth TD of approximately .18 inches and a tooth height TH of approximately 0.50 inches. The tooth clearance angle C lies in the range of 9°–11°. The working surface 18 of tooth A and B has a height WH of approximately 1.2 inches and a width WD or crown of approximately 0.007 inches when viewed from above as in FIG. 3b. According to FIG. 3a the un-ground leading surface 12 exhibits a forward rake angle $R_1$ of approximately 15°. The working surface 18, however, exhibits a minus rake angle $R_2$ of approximately $-10°$. In practice the rake angle $R_2$ of the working surface 18 can be anywhere within the range of $-20°$ to $+25°$. It has been found though that for the majority of all operations, a negative rake angle $R_2$ in the range of $-5°$ to $-10°$ is preferable.

Figure 3D:
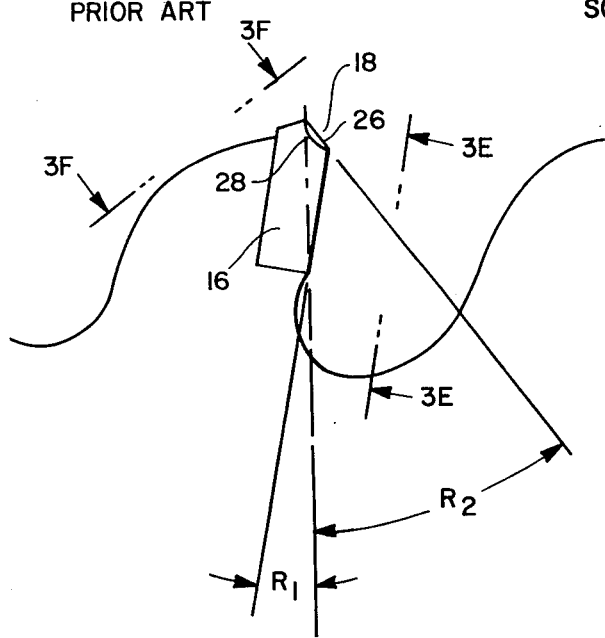
Figure 4:
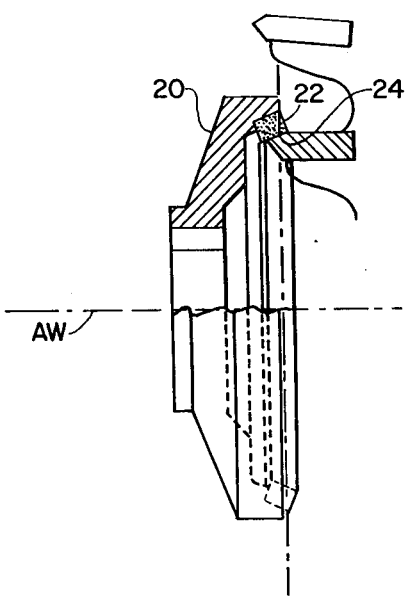
FIG. 4 discloses the prior art techniques of plunge grinding whereby cylindrical or conical surfaces are generated upon the teeth of a circular saw.

The working surface 18 is generated by a grinding wheel 20 having an abrasive inner grinding surface or rim 22. The grinding method using that grinding which is hereinafter referred to as plunge grinding and is illustrated in FIG. 4. According to the plunge grinding technique, the grinding wheel 20 is caused to revolve about a central axis AW. The distance from the grinding axis AW to the surface of the tooth and therefore to the inner surface 24 of the abrasive rim 22 is designated as RG. In practice, the grinding radius of the wheel RG may be in the range of 1 - 4 inches. The radius RG as illustrated in FIGS. 3a and 3d is approximately 1 inches. The working surface 18 imparted by the grinding wheel 20 to tooth A or B has a shape that is dictated largely by the contour of the surface 24 of the tooth 22. For example, if the surface 24 has a straight profile as shown in FIG. 4 but is tapered inward toward the axis AW, the working surface of the tooth 18 may be slightly conical in shape. In other words, the working surface 18 will describe a section of a cone. If grinding surface 24 were irregular or curved, then the surface 18 generated by such a grinding surface 24 would be a section of an irregular surface of rotation. The characteristic that all working surfaces 18 have in common is that they are all generated by a circular grinding wheel of the sort illustrated in FIG. 4. Therefore, the working surface 18 must be such that the center of the working surface 26 is slightly more forward than the sides of the working surface 28 where they come into contact with the side 16 of the teeth A or B. The working surface 18 generated according to the method of FIG. 4 can also be described in terms of a plane P which is perpendicular to the reference angle AW and passes through the working surface 18. Since the working surface 18 is generated by the revolution of the wheel 20, points on its surface can be characterized by the fact that all points on the working surface 18 which lie in the same given plane P perpendicular to the axis of rotation of the grinding wheel AW are equally distant from any given point on that axis AW. This is self-evident since any given point X on the face of the grinding surface 24 will revolve in a circle about the reference axis AW. Since the working surface 18 is a section of a surface of rotation, that section of the working surface 18 cut by the plane P will be equally distant from any given point on reference axis AW.

Figure 3E:
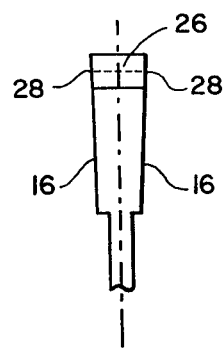
FIG. 3e is a view of the prior art tooth of FIG. 3d as seen from perspective 3e — 3e.
Figure 3F:
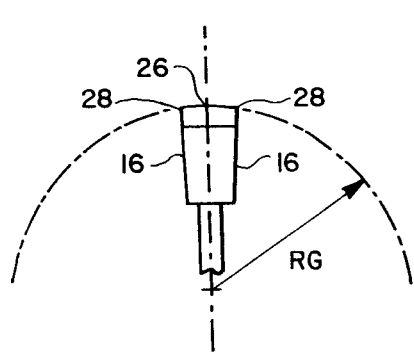
FIG. 3f is a view of the prior art tooth of FIG. 3d as seen from perspective 3f — 3f.

Details of a typical tooth generated by the prior art plunge grinding technique are shown in FIGS. 3d, 3e and 3f. FIGS. 3d - f illustrate, in particular, the curved nature of the working surface 18. As described previously, the center 26 of the working surface 18 is further advanced than the edges of the working surface 28. This feature is especially prominent in FIG. 3f. FIG. 3f corresponds to a view of the working surface 18 wherein the plane of 3f is parallel to plane P is illustrated in FIG. 4. Note that the working surface 18 as seen from view 3f forms a sector of a circle having a radius corresponding to the grinding radius RD of the grinding wheel 20. According to the preferred embodiment of the invention, the working surface 18 may actually form a section of the area of a cone. However, since thw roking surface 18 is produced by rotary action, any plane perpendicular to the axis of rotation AW of the grinding wheel 20 and passing through the working surface 18 will bisect a section of a circle. Therefore, any point on that bisected portion of the working section 18 will be equally distant from any given point on the grinding axis AW. This relationship will be so regardless of whether the working surface 18 is a portion of a cone, a cylinder or some surface exhibiting irregularites in the direction of the reference axis AW.

The plunge grinding method of producing saw teeth having a conical or cylindrical geometry was discussed with references to FIG. 4. In FIG. 4 the grinding wheel 20 includes an abrasive inner rim 22 having a grinding surface 24 which is canted at an angle with respect to reference axis AW. According to this plunge grinding technique, the grinding wheel 20 is brought into grinding contact with the blade 10 in such a manner that the axis AW almost passes through the center of the circular saw 10. Unfortunately, this technique is rather limited since it only produces a saw tooth having a fixed rake angle corresponding to the angle between the grinding surface 24 and the axis AW. Since the axis AW is unchangeable relative to the rest of the machinery, a new grinding wheel 20 must be employed each time a saw is to be ground to a different rake angle.

One technique employed in the prior art to overcome the necessity of having multiple grinding wheels for different rake angle requirements described in copending application Ser. No. 587,504 and is illustrated therein as FIG. 4b. According to that technique, the grinding surface 24 of the abrasive grinding rim 22 is approximately parallel to the reference axis AW of the grinding wheel 20. In order to achieve different rake angles, the grinding wheel 20 is set on a spindle (not illustrated) which may be selectively positioned at a variety of different angles relative to the circular saw blade 10. By adjusting the reference axis AW relative to the saw blade 10 it is possible to generate a variety of working surfaces 18 having different rake angles. The aforedescribed technique is identical in some respects to the technique further described herein.

An understanding of the foregoing prior art is essential to a complete understanding of the present invention. For that reason, the prior art has been explained in great detail. In particular, the plunge grinding technique has been thoroughly discussed because the present invention comprises a distinct improvement over that prior art method. In addition, the teeth of the circular saw generated by the method of the present invention are very similar to the prior art teeth illustrated in FIGS. 3a through 3f except for the fact that the teeth of the present invention have a working surface whose contour comprises a section of an elliptical cylinder rather than a section of a cone or spherical cylinder. These details will be discussed further with reference to FIGS. 6a through 6c.

There are several specific disadvantages to the plunge grinding technique illustrated in FIG. 4. One disadvantage is that a variety of grinding wheels with different degrees of curvature are necessary to produce a variety of different working surfaces. Second, since the grinding wheel according to the prior art technique typically plunges to the same depth each time, it has been found that the abrasive inner rim will wear unevenly. Uneven wear of the abrasive inner rim will in turn cause progressively irregular grindings of the working surface. Third, when using the plunge grinding technique, it was often found necessary to make the diameter of the wheel slightly oversized so as to avoid contacting the circular saw at more than one point. Fourth the sequencing means necessary to control the relative motion of the machine elements was moderately complicated. And, fifth, despite the fact that the plunge grinding technique saved a lot of time it was determined that excess time was spent in the retracting and advancing of the grinding wheel.

Figure 5A:
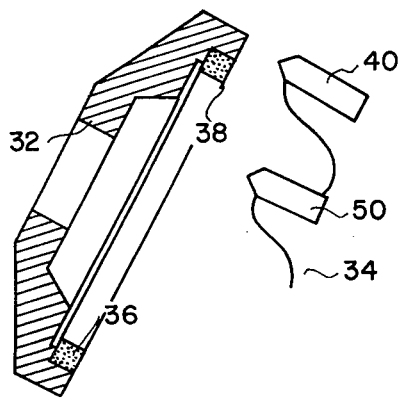
FIGS. 5a through 5e illustrate the method of point or edge grinding the teeth of a circular saw according to a preferred embodiment of the present invention.
Figure 5B:
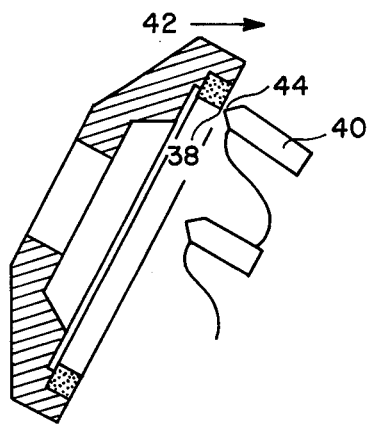
Figure 5C:
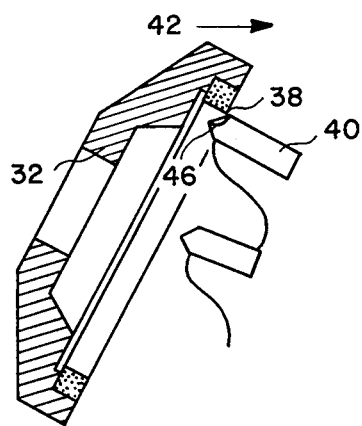
Figure 5D:
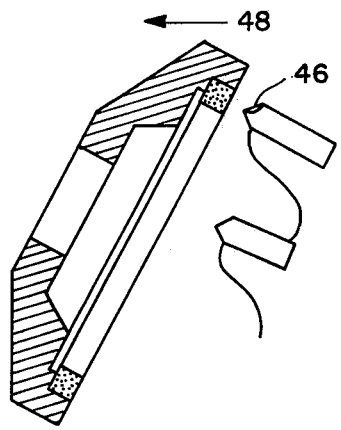
Figure 5E:
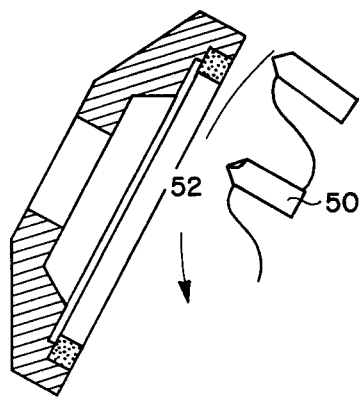

The method of point (i.e. edge) grinding the tooth of a circular saw blade according to the present invention is illustrated in FIGS. 5a through 5e. In FIG. 5a the grinding wheel 32 is illustrated at the beginning of the machine cycle in its fully retracted position. The distance between the grinding wheel 32 and the saw blade 34 is exaggerated for purposes of illustration only. The grinding wheel 32 includes an abrasive rim 36 having a leading edge 38. The saw blade 34 is equipped with a plurality of carbide inserts 40 in the same manner as described with reference to the prior art in FIGS. 1 through 3f. From the fully retracted position as shown in FIG. 5a the wheel 32 is next advanced in the direction of arrow 42 as shown in FIG. 5b. In FIG. 5b the leading edge 38 of abrasive rim 36 is just making contact with the tip 44 of carbide insert 40. As shown in FIG. 5c, the leading edge 38 continues across the top face of the saw tooth and while it does it imparts an elliptical working surface 46 to the carbide insert 40. After the cup-shaped grinding wheel 32 has passed over insert 40 it is thereafter retracted in the direction of arrow 48 and reassumes the fully retracted position as shown in FIG. 5a. Finally, the next tooth illustrated as element 50 is indexed forward in the direction of arrow 52 and assumes the position previously occupied by insert 40 as shown in FIG. 5a. At that point the sequence illustrated in FIGS. 5a to 5e is repeated until all of the teeth of the circular saw have been ground.

The terms point or edge grinding may be used interchangeably to describe the method illustrated in FIGS. 5a through 5e. The essence of the method is that only the leading edge 38 makes contact with carbide insert 40. This technique is clearly distinguishable from plunge grinding in two major respects. First of all, only a very small portion of the grinding surface 38 contacts the carbide insert 40. Secondly, the point of contact of the leading edge passes over the face of the tooth as the tooth is ground. According to the prior art plunge grinding technique the abrasive inner rim of the grinding wheel is pushed into the face of the tooth rather than across it.

The point grinding method described herein has several major advantages over the prior art plunge grinding technique. First of all, it is possible to grind a variety of working surfaces on a carbide tooth with the same cup-shaped grinding wheel. This is accomplished by tilting the angle of attack of the grinding wheel with respect to the circular saw. The grinding wheel imparts a section of an elliptical cylinder to the working surface since the projection of a tilted circle against a plane is an ellipse. Another advantage to the present technique is that a much shorter retracting and advancing stroke is required due to the relative geometry of the grinding wheel 32 with respect to the saw blade 34. One of the most important advantages of the technique described in FIGS. 5a through 5e is that the grinding wheel is self-dressing and therefore does not assume the irregularities of the saw blade tooth in the manner frequently associated with plunge grinding. The term self-dressing is used to suggest that the abrasive rim 36 does not have to be removed to time and reground or otherwise redressed. Accordingly, the cup-shaped grinding wheel is used until such time as the grinding rim 36 has been entirely worn down at which point it is removed and the entire assembly is replaced by a new grinding wheel. Due to the limitations of the plunge technique, it has been necessary to remove the cup-shaped grinding wheel illustrated in FIG. 4 frequently so that the abrasive inner rim may be redressed.

If the self-dressing grinding wheel 32 is continually used the leading edge 38 of the abrasive rim 36 will start to wear. Under those circumstances the leading edge 38 will start to move backwards thereby rounding the corner of the abrasive rim 36. However, while this happens it is important to keep in mind there is still only point or edge contact between the abrasive inner rim and the carbide insert 40. As the leading edge wears down the locus of contacting edges moves slowly backward imparting a rounded profile to the abrasive rim 36. It may be desirable for the machine operator to adjust the position of the grinding wheel 32 from time to time so as to maximize the efficiency of the grinding operation. The edge grinding technique just described has the major advantage that the grinding wheel does not have to be removed periodically and redressed. Instead, by using the edge grinding technique the same grinding wheel may be used continually until the abrasive rim is entirely worn away at which point the grinding wheel is replaced by a new one.

Figure 6A:
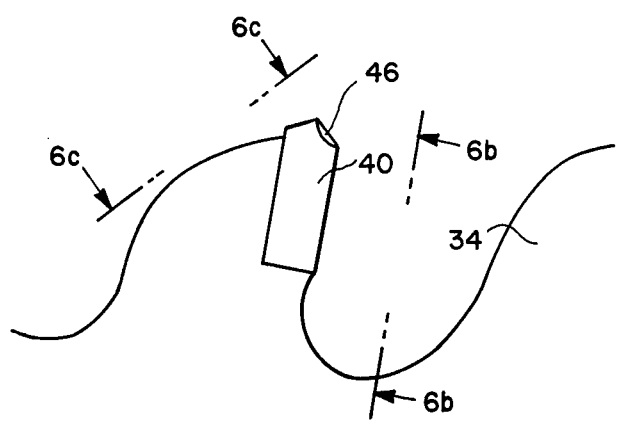
FIGS. 6a through 6c illustrate the saw teeth of the present invention as ground according to the method illustrated in FIGS. 5a through 5e.
Figure 6B:
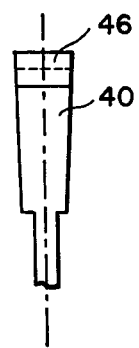
Figure 6C:
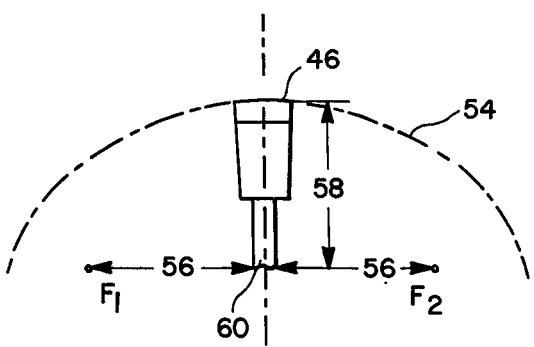

One tooth ground according to the edge grinding technique described in FIGS. 5a through 5e is illustrated in different views in FIGS. 6a through 6c respectively. For ease of illustration only one tooth 40 of the circular saw 34 is illustrated. That one tooth could be either a "high" or a "low" tooth of a triple-chip cut circular saw blade. The same tooth is seen in FIG. 6b from the front. It is clear from FIGS. 6a and 6b that the carbide insert is identical to that of the prior art such as illustrated in FIG. 3e except for the characteristics of the working surface. The improved geometry of the working surface 46 will be appreciated with reference to FIG. 6c when compared to the prior art as illustrated in FIG. 3f. From perspective 6c—6c it is clear that the working surface 46 has a contour which comprises a portion of an ellipse 54. Since working surface 46 actually lies in a three dimensional plane, it is clear therefore that working surface 46 actually comprises a portion of an elliptical cylinder. Ellipse 54 is the projection of the grinding wheel upon the carbide insert tooth 40. If there is a zero angle of attack then the ellipse forms a circle. If the angle of attack is other than zero, then the curve 54 becomes more elliptical. As with all ellipses the figure has two focii $f_1$ and $f_2$. The major axis 56 of the ellipse is defined as the distance from the center of the ellipse to either one of the two focci $f_1$ or $f_2$. The minor axis 58 is defined as the distance from the center of the ellipse to the closest portion of the curve. It will be noted from FIG. 6c that the working surface 46 comprises that portion of the ellipse 54 which is closest to the center 60. In other words, the contour of the working surface 46 is taken from the longest side of the ellipse 54 and includes the point from which the minor axis 58 is measured with respect to the center 60 of the ellipse. It has been found that this portion of the ellipse exhibits the best cutting characteristics and is easiest to grind.

As stated above, the circular saw 34 is identical to those described in FIGS. 3a through 3f except for the nature of the working surface 46. Therefore, the saw tooth according to the preferred embodiment illustrated in FIGS. 6a through 6c also exhibits the following characteristics: A tooth depth TD of approximately 0.18 inch and a tooth height TH of approximately 0.50 inch; a tooth clearance angle C in the range of 9°–11°; a working surface 46 with a height WH of approximately 0.12 inch and a width WD or crown of approximately 0.007 inch when seen from perspective 6b — 6b; a forward rake angle $R_1$ of approximately 15°; a negative rake angle on the working surface 46 of approximately −10°. In practice, the rake angle $R_2$ of the working surface 46 can be anywhere within the range of −20° to +25°. It has been found though that with the majority of all operations, a negative rake angle $R_2$ in the range of −5° to −10° is preferable. In addition to the foregoing characteristics the prior art teeth and the teeth according to the preferred embodiment of the present invention also exhibit the same following proportions: The leading and trailing teeth may vary in height H in the range from 0.010 to 0.012; the leading teeth and subsequent teeth would have a central top plateau surface P with dimensions of approximately 0.12 inch; the top sides of the teeth are tapered with a bevel BV of approximately 45°; all teeth would have a side clearance SC of approximately 2° and the teeth would exhibit a kerf K of approximately 0.247 inch. The foregoing are the general characteristics of a tooth according to the preferred embodiment of the present invention as adapted for use with a triple-chip steel cutting circular saw blade with carbide inserts.

Certain modifications of the invention just described are considered to be within the scope and spirit of the invention. For example, a variety of abrasive grinding wheel rims can be satisfactorily employed to produce the results described. The preferred saw blade described is one having carbide inserts and adapted to cut steel stock and the like. It will be appreciated by those of ordinary skill in the art, however, that other types of saws may be produced according to those teachings.

While the present invention has been described with reference to the preferred embodiment thereof, it will be appreciated by those of ordinary skill in the art that various changes in form and detail may be made therein without departing from the spirit and scope of the invention.

We claim:

1. A method for automatically point grinding the teeth of a circular saw to an improved contour, said method comprising the steps of:
   securing said circular saw in a relatively immobile fashion;
   advancing the abrasive rim of a cup-shaped grinding wheel into grinding contact with one tooth of said circular saw;
   grinding a portion of the face of said tooth to a substantially elliptical contour at a more negative average rake angle than the remaining portion of the face of said tooth; and,
   withdrawing grinding cup-shaped wheel from the vicinity of said tooth.

2. A method for automatically point grinding the teeth of a circular saw to an improved contour, said method comprising the steps of:
   securing said circular saw in a relatively immobile fashion;
   passing the abrasive rim of a cup-shaped grinding wheel over the face of one tooth of said circular saw thereby grinding a portion of the face of said tooth to a substantially elliptical contour having a more negative average rake angle than the remaining portion of the face of said tooth; and,
   withdrawing the grinding cup-shaped wheel from the vicinity of said tooth.

* * * * *